July 20, 1954  J. L. BILLS  2,684,390
CONVERSION AND QUENCHING PROCESS AND APPARATUS
Filed May 8, 1950
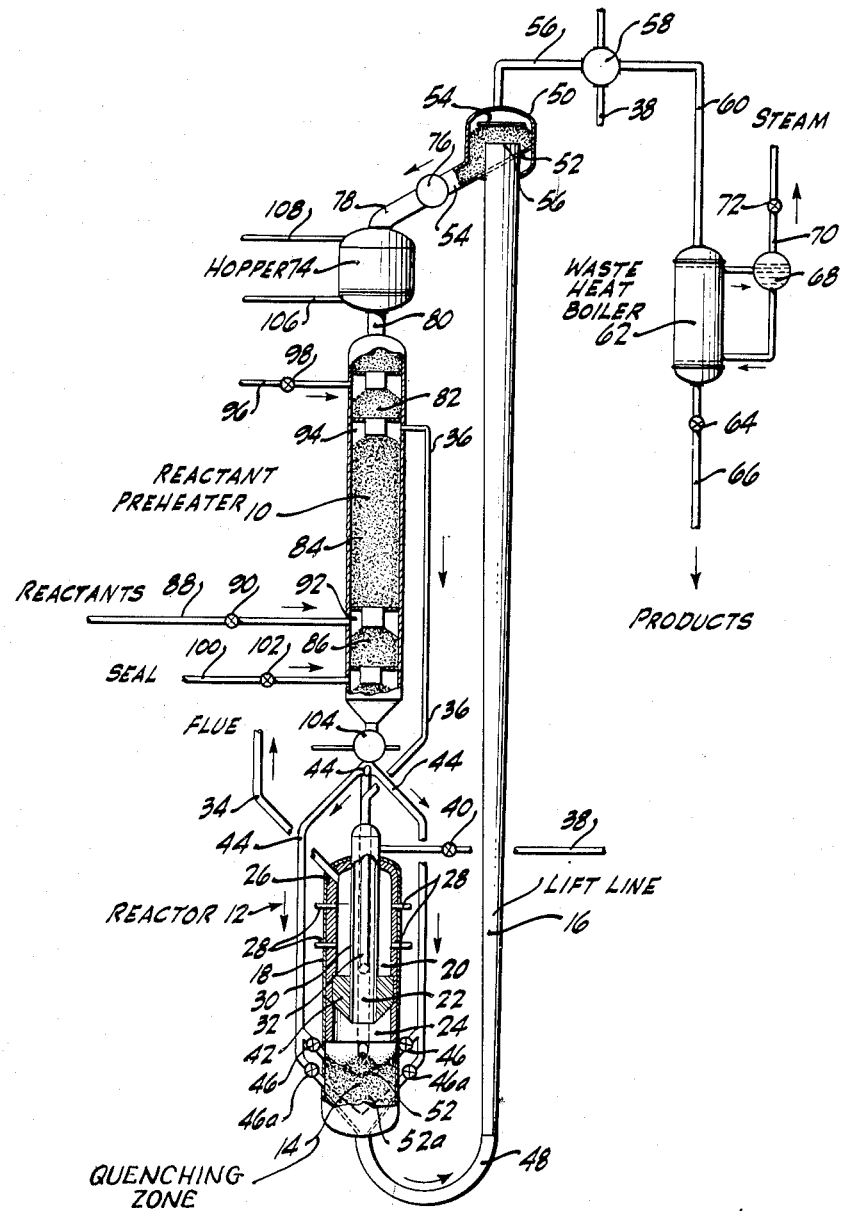
INVENTOR.
JOHN L. BILLS,
BY
AGENT.

Patented July 20, 1954

2,684,390

UNITED STATES PATENT OFFICE 2,684,390

CONVERSION AND QUENCHING PROCESS AND APPARATUS

John L. Bills, Long Beach, Calif., assignor to Union Oil Company of California, Los Angeles, Calif., a corporation of California Application May 8, 1950, Serial No. 160,775

26 Claims. (Cl. 260—679)

This invention relates to the rapid heat transfer from gases such as are encountered in high temperature gas phase reactions and in particular relates to an improved process for quenching effluent fluids from such high temperature reactions. This invention further relates specifically to improved high temperature processes in which fluid products are quenched by contact with a continuously moving stream of granular solids and in which part of the heat is employed to convey the solids and a substantial part of the heat thus absorbed is subsequently employed to heat the reactants.

Examples of high temperature conversions include processes for the production of acetylene, butadiene, ethylene, and the other unsaturated hydrocarbons by catalytic or non-catalytic pyrolysis or partial oxidation. The production of these and other constituents has grown to a substantial position in industrial operations. It is essential to these and similar conversions that a short contact or reaction time be maintained and it is of extreme importance that a rapid cessation of the main reaction as well as a prevention of undesirable side reactions be obtained. Usually at the desired temperature of conversion the main reaction predominates. Since the temperature is usually extremely high the reaction rate is also very high and only a short time is needed to produce the desired result. At lower temperatures such as may occur during a slow cooling of the reaction products undesirable side reactions may take place which, in aggravated conditions, may consume the entire quantity of the desired product produced at the higher temperature. In any event, slow or inefficient cooling of the product fluids usually results in a material loss of the main product.

The temperatures encountered in such reactions vary in the range of somewhat below about 1000° F. to as high as or somewhat higher than 3000° F. In the unsaturated hydrocarbon production processes the usually encountered temperatures vary between about 1500° F. and 2500° F. for such constituents as acetylene and butadiene. The rapid reduction of the temperature of the effluent gases produced from such conversions has long been known to be desirable and it has been accomplished by such means as quenching the effluent gases with cold water sprays, by steam dilution or by injecting oil, which may in some instances be the feed stock to the processes, into the effluent stream. Among the results of such a quenching step are such deleterious effects as loss of soluble products in the steam or water upon condensation of that portion of the effluent gases, the loss of carbon black and certain aromatic hydrocarbon constituents present in minor quantities in the gas product, as well as the undue dilution of the product gases thereby increasing the volume which must of necessity be treated for the recovery of the desired product. It has been the practice to inject as a spray a sufficient quantity of water to lower the temperature of the gas and raise that of the water to about 150° F. requiring a tremendous volume of water. Such a procedure is very wasteful of heat as the product is at such a low temperature as to be useless for other process heating. To avoid some of the foregoing disadvantages it has been proposed to inject a stream of powdered solids into the stream of products to form a gaseous suspension whereby heat is absorbed in the powder. Such a system presents further problems not encountered in the previous methods of quenching which include the separation of the powder from the suspension, the unattainability of true concurrent contact as well as the fact that the maximum energy in the gas which should be removed is not efficiently so transferred.

The present invention is therefore directed to a method and apparatus in which the maximum quantity of energy available in the reaction product gases is rapidly transferred to a substantially compact concurrently moving bed of granular solids in which the thermal energy is absorbed at a temperature sufficient to prevent undesirable reactions, to stop immediately the main reaction and to permit the utilization of the thus absorbed heat in preheating the reactants to the process or for other uses.

In this application, the term "quenching" is intended to mean the rapid decrease in temperature of gaseous or liquid fluid.

It is therefore an object of this invention to provide an improved process for quenching hot fluids.

It is a further object of this invention to provide a process wherein hot fluids are simultaneously cooled by direct contact with a compact moving mass of granular solids, by conveying the solids through an elongated conveyance zone, and by depressuring the hot fluids through a porous mass of substantially compact granular solids.

An additional object of this invention is to provide a process wherein hot gaseous reaction products are quenched by the concurrent depressuring thereof through a compact mass of granular solids being conveyed by the depressuring product gas through an elongated conduit.

Another object of this invention is to provide a process wherein heat in the product gases is absorbed as sensible heat in a compact mass of granular solids and is introduced into the reactants by a countercurrent contact of the hot solids with a process feed gas.

Another object of this invention is to provide a process in which the hot product gases are concurrently contacted with granular solids and the hot granular solids thus produced are countercurrently contacted with the process feed gas.

It is a further object of this invention to provide an improved process for high temperature thermal, flame or catalytic reactions in which the hot reaction products are concurrently depressured through, and thereby convey, a moving bed of substantially compact granular solids through an elongated quenching and conveyance zone to form relatively cool reaction products and relatively hot granular solids, subsequently countercurrently contacting the hot solids with at least a portion of the feed reactants thereby forming relatively hot reactants and cool granular solids, and returning the cool granular solids to the quenching zone.

It is also an object of this invention to provide an apparatus adapted to carry out the aforementioned objects.

Other objects and advantages of this invention will become apparent to those skilled in the art as the description thereof proceeds.

Briefly, the present invention comprises the conveyance of a granular solid mass consisting of a body of granular solids maintained at their maximum bulk density in an elongated conveyance zone in which the moving forces for the solids are supplied by direct contact with depressuring reaction products of a conversion process producing such an effluent. The hot reaction products in direct contact with the moving mass of granular solids lose heat to the solids extremely rapidly due to a high temperature differential and a large cross sectional area of solids surface exposed. By combining such a conveyance step with a high temperature process for chemical conversion a new process of increased flexibility characterized by high heat efficiency and fast product fluid quenching is evolved. The hot reaction gases pass directly from the reaction zone into a body of cold compact granular solids while fresh cold solids are continuously introduced and heated solids are removed from the quenching zone. Under the influence of the product gases depressuring through the interstices of the compact mass of granular solids, a conveying force is generated which, upon exceeding the forces of gravity and friction acting upon the granular solids, causes the granular solids to move as a porous granular substantially compact mass of solids through the quenching zone and subsequently through an elongated conveyance zone. At the discharge outlet of the conveyance zone the granular solids and the reaction product fluids are substantially at the same temperature. The cooled product gases are removed for further processing while the heated granular solids are employed to preheat the process reactants as subsequently described.

Energy is removed from the hot product gases in three important ways.

First, a rapid quenching is obtained stopping the main reaction and reducing undesirable side reactions to a minimum by a direct contact of the hot product gases with the cold granular solids.

Secondly, the gases are further cooled by an adiabatic expansion caused by the gases depressuring through the porous mass of granular solids. This effect is more pronounced at low operating pressures than at high pressures since the pressure drop required to convey the granular solids is substantially constant and independent of changes in absolute operating pressure, and Thirdly, a portion of the energy hot product gases is stored in the granular solids as potential energy as they are delivered to the outlet opening of the conveyance zone.

It is important to point out that in the process of the present invention the granular solids in the quenching zone and in the conveyance zone are not dispersed in the gas phase so as to form an aerated suspension. They exist in both zones when at rest or when in motion as a substantially compact mass of granular solids having substantially the same bulk density when in motion as they do when unaerated and at rest. In this manner a maximum pressure drop and a minimum quantity of gas per pound of solids are obtained thereby enhancing the effectiveness of the quenching method of this invention. In other words, since the quantity of gas required to convey a unit mass of granular solids is lower than in any other conveyance process using a conveying fluid, a high ratio of solids to hot gas is obtainable under operating conditions which permits a wide range of flexibility as far as the quenching temperature is concerned. Thus by maintaining a constant throughput through the reactor the quenching temperature is very readily varied by changing the quantity of granular solids flowing into the quenching zone. Various means for regulating the flow rate of granular solids in the system herein disclosed will be more particularly described below.

By employing a concurrent flow of hot reaction gases and cold granular solids into the quenching zone, an immediate cooling of the gases and heating of the solids is obtained, both of which come to thermal equilibrium at some intermediate temperature which as above described is controllable by varying the ratio of the mass of reaction product gases to the mass of granular solids entering the cooling zone. Simple material and heat balance calculations familiar to those skilled in the art permit a ready evaluation of the proper ratio to result in any desired quenching temperature. For acetylene and butadiene manufacture the quenching temperature is desirably below a maximum of about 1000° F. and is preferably in the range of between about 572° F. and 932° F. (300° C. to 500° C.) For other conversions the required higher or lower desirable quenching temperature may be obtained either by experiment or by calculations as above stated and the actual quenching temperatures needed for any given reaction need not be further considered here.

Upon delivery of granular solids from the outlet opening of the conveyance zone the temperature thereof is found to be the quenching temperature since the temperature difference and heat transfer area are very favorable in such direct contact heat exchange. The granular solids thus discharged are passed through a preheating zone wherein the feed gas is passed counter-current to the flow of the hot granular solids. Because of the very effective heat transfer obtainable in such a system it is possible to cool the solids substantially to the feed temperature and heat the feed gas substantially to the quenching temperature by a proper balance of the solids and feed gas flow rate. It is more desirable to cool the solids to a low temperature than it is to preheat the feed to the quenching temperature and consequently in cases where the flow rate of feed gas is too low compared to the solids flow rate, granular solids discharge from the preheating zone at a temperature above the feed temperature and further means of cooling the granular solids are employed. The preheated feed is subsequently injected into the reactor in the reaction zone and the cooled granular solids pass into the quenching zone. The product gases removed from the system following quenching and conveyance are passed through a waste heat boiler to further cool the product gases and to provide the steam requirements of the process.

The process and apparatus of the present invention will be more clearly understood by reference to the accompanying drawing showing a preferred modification of the combination reaction and quenching process of the present invention. It is to be understood that although the noncatalytic reaction is described, it is within the scope of the present invention to include reactors in which the reaction effected is catalytic, noncatalytic, or thermal, or involves partial oxidation, etc. and in which the product gases are quenched in the manner according to the present invention.

Referring now more particularly to the figure, the main portions of the apparatus include reactant preheater 10, reactor 12 containing quenching zone 14, and lift line or conveyance zone 16. The reactor 12 is provided with a shell 18 and is further divided into an upper preheating zone 20 and intermediate reaction zones 22 and 24 and the quenching zone 14 at the bottom. The preheating zone is provided with burners 28 whereby the incoming reactants are further preheated to the temperature of reaction. In this particular modification of reactor no catalyst is employed and the reaction is one of partial combustion in which a flame exists in reaction zones 22 and 24. The reactants pass through preheating zone 20 via tubes 30 and 32. The annular space between tube 30 and insulating liner 26 is filled with hot flue gases injected through burners 28 and are removed from preheating zone 20 via flue gas line 34. The reactants are introduced into the inner heating tube via line 36 or the outer tubes via line 38 controlled by valve 40 of the concentric heating tubes and are preheated and are subsequently ejected into reaction zones 22 and 24. An insulating divider 42 separates preheating zone 20 from reaction zone 24 and fills the annular space surrounding a portion of outer preheating tube 30 and insulating liner 26 of reactor 12.

Granular solids, cooled substantially to atmospheric temperature or to another temperature sufficiently low to effect the required quenching of the product gases, are introduced at a plurality of points around the upper periphery of quenching zone 14 via lines 44 controlled by valves 46. The solids enter quenching zone 14 as fast as the granular solids are withdrawn therefrom through return bend 48 of conveyance zone 16. A new layer of cool granular solids flow toward the vertical axis of quenching zone 14 and each successive quantity of hot quenching gases from reaction zone 24 contacts newly introduced cold granular solids.

The reaction time between the initiation of the reaction and the time it is quenched may be varied very easily and within considerable limits according to this invention by raising or lowering the level 52 of cold granular solids in quenching zone 14. This may be done without disturbing the flow rate of either the solids or the feed gas and merely by opening valves 46a and closing valves 46 a longer contact time may be obtained since level 52 drops to level 52a.

In quenching zone 14 the temperature rapidly drops to the quenching temperature and the product gases and the granular solids concurrently depressure from quenching zone 14 through return bend 48 and conveyance zone 16 into separation chamber 50. A conveyance force ratio, defined below, of greater than 1.0 is maintained therein so that the depressuring of the gas causes conveyance of solids as a compact moving mass through conveyance zone 16. Separation chamber 50 is provided with slanting baffle 52 and outlet conduit 54 from which the solids are withdrawn. Chamber 50 is further provided with means for maintaining the granular solids within conveyance zone 16 in substantially compact form and consists of a baffle plate 54 spaced adjacent to the outlet opening 56 of the lift line. The quenched gases collect in the top of chamber 50 and are removed therefrom via line 56 through heat interchanger 58 wherein, if desired, that portion of the reactants introduced via line 38 may be preheated. The product gases then pass via line 60 through waste heat boiler 62 at a rate controlled by valve 64 and are conveyed via line 66 to storage, purification, or further processing facilities not shown. In waste heat boiler 62 the products are cooled by indirect heat exchange with water generating steam at a pressure dependent upon the temperature of the quenched product gases. Steam is removed from separator drum 68 via line 70 at a rate controlled by valve 72.

In the conveyance zone of this invention at least a certain minimum pressure drop per unit length of conveyance zone is required to convey the solids. The measure of the lifting force is $$\left(\frac{dp}{dl}\right)$$

measured in pounds per square foot per foot while the measure of the downward force is the bulk density of the solids, $\rho_s$ in pounds per cubic foot. The ratio of the former to the latter is $$\left(\frac{dp}{dl}\right)/\rho_s$$

and is termed the conveyance force ratio. For motion of the solids a force ratio of at least 1.0 is required and desirable values lie between 1.0 and about 1.5. The value of 1.0 is the minimum operable value but values above this value are required to overcome friction of solids against the conveyance zone walls, and a value of about 1.2–1.3 is satisfactory in most cases.

The quantity of fluids flowing necessary to establish such a conveyance force ratio varies directly with the fluid permeability of the compact granular mass of solids.

Separating chamber 50 is, because of the pressure drop existing across conveyance zone 16, maintained at a pressure below that in reactor 12. Since the pressure in reactor 12 is substantially the same as the pressure in reactant preheater 10 a pressure differential exists between hopper 74 and separator chamber 50. The granular solids then must be introduced via line 54 into hopper 74 against a pressure differential tending to inhibit the flow of solids. For this reason pressuring means 76 are provided whereby the granular solids are passed from a lower pressure in chamber 50 via line 54 into a higher pressure maintained in hopper 74. Apparatus which performs the required function of pressuring means 76 includes such mechanisms as the well known star feeders, sealing legs in which a countercurrent contact of solids in a sealing gas are employed, or a multichamber system of pressure pots into which the granular solids are successively introduced and removed simultaneously with proper pressuring and depressuring of the pots. Pressuring means 76 is shown schematically since there are several known types of equipment which fulfill its function and for the purposes of the present invention any such of these may be used.

The pressured and heated granular solids pass via line 78 from pressuring means 76 into hopper 74 from which they pass via line 80 successively through the various zones of reactant preheater 10, namely upper sealing zone 82, preheating zone 84 and lower sealing zone 86. The reactants to the process are introduced via line 88 at a rate controlled by valve 90 into engaging zone 92 of preheating zone 84 and subsequently pass countercurrently to the hot granular solids therein. The preheated reactants are removed from preheater disengaging zone 94 and pass via line 36 into the preheating tubes of the reactor 12 as previously described.

A portion of the preheated feed gas is prevented from passing upward toward hopper 74 by the preheating zone by introducing a sealing gas into sealing zone 82 via line 96 controlled by valve 98 whereby the pressure in sealing zone 82 is maintained equal to or slightly higher than the pressure existing in preheated reactor disengaging zone 94. A similar sealing gas is introduced via line 100 at a rate controlled by valve 102 whereby the pressure in lower sealing zone 86 is maintained equal to or slightly higher than that in reactant engaging zone 92. Thus the reactants are isolated in reactant preheating zone 84 and are prevented from passing into quenching zone 14 or through the conduit which introduces granular solids from separator chamber 50 into the upper part of the reactant preheater.

While passing through the reactant preheating zone 84 the granular solids are reduced in temperature to substantially that of the reactants introduced. In the event that the quantity of granular solids required to quench the product gases is in excess of the quantity of solids which may be cooled from the quenching temperature to the reactant inlet temperature by the quantity of reactants introduced, the temperature of the granular solids discharged from reactant preheater 10 will be somewhat higher than the reactant inlet temperature. In order to "trim" the temperature of the granular solids discharged from the preheater, indirect cooling means 104 are provided to further cool the granular solids prior to their being passed as pointed out above via line 44 into quenching zone 14. A desirable modification where a plurality of reactant gases are used involves the use of parallel preheating zones, one for each reactant and the introduction of a separate stream of solids into each preheater. The solids from each then are introduced into the quenching zone. In some cases it may be desirable to employ cooling means 104 in any event to further cool the granular solids to a temperature below that of the reactants.

From the foregoing discussion it is apparent that the process of the present invention consists broadly in the rapid reduction in temperature of hot reaction product fluids by concurrent contact of such fluids in a quenching zone with a concurrent flow of substantially compact granular solids and the simultaneous utilization of the hot products of reaction to convey such granular solids through a conveyance zone.

More narrowly it consists of a process, as above stated, in combination with the utilization of the heated granular solids for the countercurrent preheating of the reactants from which the hot product fluids are prepared. The essence of the invention is the concurrent quenching and conveyance of compact granular solids by means of the conversion product fluids.

As an example of the present invention as applied to high temperature processes and product quenching the following examples are presented:

*Example I*

A partial oxidation of natural gas with air employs 2400 s. c. f./hr. of air preheated in two steps to a temperature of 2500° F. and 1100 s. c. f./hr. of natural gas preheated to 1200° F. These gases are mixed for reaction in 0.01 second in the apparatus of the present invention. The product gas is produced at a rate of about 3680 s. c. f./hr. and contains 3.0% by volume acetylene. These gases are quenched from 2650° F. in concurrent contact with 2980 pounds per hour of 0.5 inch particles of granular coke in a quenching zone to a temperature of 750° F. and the gases depressured through a conveyance zone as described. The coke particles are separated from the product gases containing some deposited tars. A part of the coke was contacted with a mixture of flue gas and air whereby the coke is further heated to 1250° F. The natural gas feed is preheated in direct contact with this heated coke, cooling the coke to the natural gas inlet temperature. The cold solids resulting are returned to the quenching zone.

*Example II*

A reactor is constructed with a surface combustion zone and an elongated reaction chamber and combustion gases formed from 94.5 s. c. f./hr. of fuel gas are depressed therethrough from a pressure of 27.7 p. s. i. a. The feed stock is vaporized straight-run naphthenic gasoline boiling between 170° F. and 220° F. It is preheated and introduced at a rate of 4.62 gallons per hour radially at the sonic velocity (about 800 feet per second) into the reaction chamber mixing with flue gases of maximum temperature in the range of 2200° F. to 3400° F. and flowing at their sonic velocity of about 2800 feet per second. A reaction time of 0.024 second is employed at a reaction chamber temperature of 1500° F. producing 1210 s. c. f./hr. of effluent containing 1.61% by volume of butadiene. This amounts to 9.65% by weight of the feed. The effluent is quenched from 1500° F. to 850° F. by concurrent contact in a quenching zone according to this invention with 116 pounds per hour of crushed alumina having a mesh size of 2–8. The thus quenched gases are separated from the heated alumina and purified after further cooling in a waste heat boiler. The heated alumina is directly cooled by employing it to vaporize and partially preheat the naphtha feed and is later returned to the quenching zone.

Example III

The quenching method of the present invention is applied to the partial oxidation of low molecular weight hydrocarbons for production of ethylene using oxygen. The feed gas is ethane of 92% purity flowing at a rate of 2820 s. c. f./hr. and preheated in several steps to about 1230° F. Oxygen at a rate of 1230 s. c. f./hr. is preheated to variable temperatures between 850° F. and 950° F. The two streams are turbulently mixed in a reactor, the temperature rising to about 1570° F. The product gases are generated at a rate of 4800 s. c. f./hr. and are quenched from 1570° F. to 400° F. by a concurrent depressuring contact with a moving mass of 3960 pounds per hour 0.125 inch stainless steel balls conveyed through the conveyance zone leading from the quenching zone. The product gases contain 33% by volume ethylene and 14% unconverted ethane. The ethane conversion is about 80%. The steel balls are heated from 95° F. to 400° F. and are recirculated through preheating zones to preheat the gaseous reactants. As this operation is carried out at about 0.8 atmosphere absolute pressure, a vacuum pump takes suction at the discharge of the conveyance zone to compress the product gases from about 0.3 atmosphere to sufficient pressure for ethylene separation.

Example IV

A catalytic process for production of hydrogen cyanide over a platinum catalyst is modified to utilize the quenching step of this invention. A reactant gas comprising 12% ammonia, 50% methane, and 38% air is preheated from 75° F. to 750° F. by contacting the gas countercurrently with granular solids used in concurrent quenching of the product gases thereby cooling the solids substantially to 85° F. The gases are injected into an externally heated reactor and the reaction temperature is approximately 2200° F. The reacting gases are in contact for 0.042 second with a platinum catalyst. The product gases contain 9% hydrogen cyanide and 4% unreacted ammonia and are quenched from 2200° F. to 775° F. by concurrently depressuring the gases through a compact moving mass of crushed granular quartz particles heating them from 80° F. to 750° F. in the quenching and conveyance zone of this invention. The heated solids are separated from the quenched gases and are contacted countercurrently with portions of the cold reactant gases preheating them and cooling the solids to 85° F.

It is to be understood that the foregoing examples are merely illustrative of the application of the present invention to various high temperature operations wherein fast quenching of fluids and thermal economy are desirable and are not intended to restrict the disclosure to those particular processes described since those skilled in the art may be aware of other operations in which such quick cooling of fluids as well as quick heating of solids may be used.

It is to be pointed out that the process for quenching hot conversion product fluids is applicable as well to hot effluent fluids from reactors which employ a catalyst to accelerate the desired reaction. The catalyst may be a moving or stationary bed type of catalyst or it may be an aerated suspension of catalyst solids in the reactant fluids. In any event the conversion fluid products are quenched efficiently by the concurrent contact quenching and conveyance method of the present invention.

In high temperature hydrocarbon conversions such as those named above, frequently carbon is deposited in one form or another on the heated surfaces exposed to the reacting gases. In the present invention such carbon may, if desired, be deposited on the circulating solids and contacted with a gas containing oxygen to burn such carbonaceous deposit. The heat thus generated is largely absorbed by the circulating granular solids and if carried out at a point in the process immediately prior to the reactant preheating step it is possible to preheat the reactants to a temperature substantially in excess of the quenching temperature obtained in the modification described above in connection with the drawing. To carry out this latter modification hopper 74 may be provided with inlet 106 and outlet 108 for oxygen containing gases and optionally fuel to heat the solids above the quench temperature and burn off any carbonaceous deposit.

The materials of construction required in the apparatus of the present invention may be especially resistant to the effects of high temperatures. Preheating tubes used within the reactor proper are preferably made of quartz or mullite or a bonded silicon carbide. It is desirable also to employ as a refractory lining a similar type of material.

The granular solids circulated in the process for the purpose of quenching the conversion product fluids are preferably a heat stable granular solid having a high heat capacity and a high value of thermal conductivity as well as being chemically stable. The granular solids thus employed should have a high resistance to spalling since the skin temperature of the granular solids rises higher than the average temperature of the granular solids momentarily during quenching. This effect occurs only at the surface of the mass of granular solids in the quenching zone against which the hot products impinge.

Materials which are suitable for the purpose of using as a quenching medium according to this invention, include prepared materials in the form of balls, fragments formed from crushing or screening larger solids, but preferably are relatively uniform in shape. Materials such as porcelain, mullite, granular coke, metal balls such as stainless steel, the various thermally stable metallic oxides and carbides, including calcium, magnesium and aluminum oxide, silicon carbide and graphite, various heat stable clays such as mullite, granular quartz, and virtually any other granular solid having a reasonable heat conductivity and heat capacity.

In the quenching and conveyance zone of the present invention a material and heat balance calculation will determine the quantity of granular solids necessary to quench a given product gas from the reaction temperature to a predetermined desirable quenching temperature. Once this is known a rough estimation of the approximate size of the granular solids to be employed may be determined in order to give the least pressure drop across the conveyance zone. In other words, when using relatively fine granular solids such as those having a mesh size between 12 and 30, a small quantity of gas only is required to convey a given mass of granular solids. With larger granular solids such as those having a mesh size of about 4 or less, the quantity of gas required to convey a unit mass of granular solids increases. For example, in a conveyance conduit having a pressure drop of 12 pounds per square inch, 80 pounds of 12 to 30 mesh coke granules are conveyed per standard cubic foot of conveyance gas, whereas, only 12 pounds of 4 mesh granular solids are conveyed under the same conditions. These solids to gas ratios are maximum values and stable operations (at somewhat higher pressure drops) are permissible by restricting the solids flow rate at the discharge of the conveyance zone while permitting greater quantities of gas to flow. This gives the process wider flexibility since solids to gas ratios well below those values given above are readily operable.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process which comprises establishing a conversion zone for high temperature conversions and a quenching zone communicating therewith, introducing preheated reactants into said conversion zone, passing hot conversion effluent therefrom into said quenching zone, establishing a moving bed of compact granular solids in said quenching zone, concurrently depressuring said effluent at a rate sufficient to convey said compact granular solids from said quenching zone through a conveyance zone forming quenched effluent and heated solids, subsequently countercurrently contacting at least part of said reactants with at least a portion of said heated solids forming said preheated reactants and cool solids, and returning said cool solids to said quenching zone.

2. A process according to claim 1 including the step of varying the level of granular solids in said quenching zone to vary the duration of said conversion.

3. A process according to claim 1 including the step of further heating said granular solids discharged from said conveyance zone by burning carbonaceous materials which accumulate thereon by contacting the solids with an oxygen-containing gas.

4. A process according to claim 1 including the step of dividing the heated solids into a plurality of streams, and countercurrently contacting each of said streams with a reactant stream to cool said solids stream substantially to the fresh reactant inlet temperature and form preheated reactants.

5. A process according to claim 1 wherein said reactants comprise a hydrocarbon gas and a gas containing oxygen, and said effluent comprises a gas containing unsaturated hydrocarbon constituents.

6. A process according to claim 1 including the step of maintaining the value of the conveyance force ratio $$\left(\frac{dp}{dl}\right)\bigg/\rho_s$$

at a value greater than 1.0 throughout said conveyance zone.

7. A process according to claim 1 including the step of varying the weight ratio of granular solids to effluent gases introduced into said quenching zone by varying the rate at which solids discharge from said conveyance zone.

8. An apparatus for high temperature conversions which comprises a conversion chamber, inlet means for reactants opening thereinto, an elongated vertical quenching chamber adapted to downward flow of a bed of compact solids therein, said conversion chamber opening into the upper portion of said quenching chamber, inlet means for cool solids opening into said quenching chamber at an intermediate point along the length thereof to provide a compact accumulation of cool solids in the lower portion thereof, an elongated conveyance conduit having its inlet opening into the lower portion of said quenching chamber below the level of said accumulation of solids and its outlet opening into an elevated separator chamber, an outlet therefrom for quenched fluids, means therein adapted to apply a compacting force against solids discharging from said conveyance conduit to prevent solids fluidization and maintain them in compact unfluidized form therein, at least one elongated vertical preheating chamber adapted to the downward flow of a bed of compact solids therethrough, means for passing heated solids from said separator chamber into the upper end of said preheating chamber, an inlet near the lower end thereof for reactant to be preheated, an outlet near the upper end thereof for preheated reactant communicating with said inlet means to said conversion chamber, said solids being circulated throughout said apparatus as a compact unfluidized moving bed absorbing heat from said conversion products and delivering heat to said reactants.

9. An apparatus according to claim 8 in combination with a plurality of cool solids inlets disposed along the side of said quenching chamber whereby the distance between the conversion chamber outlet and the level of cool solids in said quenching chamber may be varied.

10. An apparatus according to claim 8 wherein said means for passing solids from said separator chamber to said preheating chamber comprise a pressuring solids feeder communicating via conduits with said separator and preheating chambers and adapted to pass hot solids from the relatively low pressure of said separator chamber to the relatively high pressure of said preheating chamber.

11. An apparatus according to claim 10 wherein said means comprise a star feeder.

12. An apparatus according to claim 10 wherein said means comprise a multichamber system of pressure pots into which the granular solids are successively introduced from said separator chamber and removed to said preheating chamber simultaneously with appropriate pressuring and depressuring of the pots.

13. An apparatus for conducting high temperature vapor phase reactions in which the hot reaction product is rapidly quenched which comprises at least one vertical elongated preheater vessel, an upper inlet for heated solids thereto, a lower outlet for cooled solids therefrom, means for passing a countercurrent flow of reactant fluid therethrough to form cool solids and preheated reactant, an externally heated reaction vessel, conduit means for introducing preheated reactant thereinto from said preheater vessel, a quenching vessel disposed below said preheater vessel, a plurality of inlets for cool solids from said preheater vessel opening at points along the length of said quenching vessel intermediate its upper and lower ends to form a compact solids accumulation therein of variable level, said reaction vessel opening into the upper end of said quenching vessel above said solids level, an elongated conveyance and cooling conduit having its inlet opening into the bottom of said quenching vessel below said solids level and its outlet opening disposed at a point above the top of said preheater chamber, a separator chamber surrounding said outlet opening and adapted to the disengaging of quenched fluids from solids discharging thereinto from said conveyance conduit, a thrust plate therein disposed adjacent said outlet opening and adapted to apply a compacting force to discharging solids and maintain them in compact unfluidized form in said conveyance conduit, means for maintaining said separator chamber at a pressure sufficiently below that of said quenching vessel so that the reaction product will flow from said reaction vessel and concurrently through said quenching vessel and conveyance conduit at a velocity sufficient to convey the compact unfluidized solids from said quenching vessel into the elevated separator chamber, and a transfer conduit for heated solids opening from said separator chamber into said upper inlet for solids of said preheater vessel.

14. An apparatus according to claim 13 in combination with means for cooling solids flowing from the bottom of said preheater vessel prior to entry into said quenching chamber.

15. An apparatus according to claim 13 wherein said reaction vessel and said quenching chamber are coaxially disposed.

16. An apparatus according to claim 13 in combination with an inlet for an inert seal gas opening into the bottom of said preheater vessel below the reactant inlet to prevent concurrent flow of reactant and cool solids therefrom into said quenching chamber, and another inlet for an inert seal gas opening into the top of said preheater vessel above the preheated reactant outlet to prevent countercurrent flow of preheated reactant through said transfer conduit into said separator chamber.

17. A process for quenching heated fluids which comprises concurrently contacting cold granular solids in substantially compact unfluidized form as a moving bed with said heated fluids, passing said fluids concurrently through said bed of solids at a rate sufficient to generate a conveying force which overcomes forces of gravity and friction acting upon said solids and thereby moving said bed of solids through an elongated conveyance and cooling zone.

18. A process for quenching heated fluids which comprises establishing a quenching and conveyance zone, passing a moving bed of cold granular solids in substantially compact unfluidized form therethrough, and passing said heated fluids into and through said moving bed of solids at a rate sufficient to lift said moving bed upwardly through said zone forming quenched fluids and heated solids.

19. A process according to claim 18 in combination with the step of controlling the ratio of the quantities of said solids to said heated fluids flowing into said quenching and conveyance zone to maintain the desired equilibrium quench temperature.

20. A process for quenching hot fluids which comprises establishing a quenching zone, maintaining an accumulation of compact granular solids therein, introducing cool granular solids at the top of said accumulation, introducing hot fluids to be quenched into said quenching zone to contact said solids accumulation, and passing partially quenched fluids thus formed concurrently with and at a rate sufficient to convey said solids from the bottom of said quenching zone as a substantially compact upwardly moving bed through a conveyance zone to form heated solids and quenched fluids.

21. A process for quenching heated fluids which comprises concurrently contacting cool granular solids in substantially compact form with heated fluids to be quenched, and depressuring said heated fluids through the interstices of said solids at a rate sufficient to lift said solids as a compact unfluidized upwardly moving mass while further cooling said fluids.

22. A process for cooling heated fluids and heating granular solids which comprises establishing a quenching zone, maintaining an accumulation of granular solids in substantially compact form therein, introducing cool granular solids into said accumulation, passing heated fluids concurrently with said solids through said accumulation, depressuring said fluids concurrently with said solids therefrom to lift said solids upwardly as a moving bed through a conveyance zone communicating with said quenching zone, maintaining said solids during conveyance through said conveyance zone in substantially compact unfluidized form, and discharging heated solids and quenched fluids from said conveyance zone.

23. A process for quenching heated fluids and heating cool granular solids which comprises establishing a quenching zone communicating with a conveyance zone, introducing cool granular solids into said quenching zone and onto an accumulation of unfluidized compact solids maintained therein, introducing heated fluids into said quenching zone to contact said accumulation of solids, passing said fluids concurrently with said solids through said accumulation and then concurrently with said unfluidized compact solids upwardly through said conveyance zone, maintaining a sufficient pressure drop per unit length in said conveyance zone to lift solids in substantially compact unfluidized form therethrough, maintaining said granular solids in said accumulation zone and in said conveyance zone in substantially compact unfluidized form, and discharging cooled fluids and heated solids from said conveyance zone at substantially the same temperature.

24. A process according to claim 23 wherein said conveyance zone is a substantially vertical zone and the conveyance force ratio $$\left(\frac{dp}{dl}\right)\Big/\rho_s$$

(wherein $$\left(\frac{dp}{dl}\right)$$

is the pressure drop in pounds per square foot per foot and $\rho_s$ is the solids bulk density in pounds per cubic foot) is maintained at a value greater than 1.0 therein.

25. A process according to claim 23 wherein the weight ratio of solids to heated fluids entering said quenching zone is controlled by the step of regulating the rate of solids discharge from said conveyance zone.

26. An apparatus for quenching high temperature fluids which comprises in combination a quenching chamber opening at its lower extremity into a conveyance conduit, an inlet means opening into the upper extremity of said quenching chamber for heated fluids to be quenched, inlet means opening thereinto at an intermediate point for cool compact unfluidized solids, said last named means being adapted to vary the level of said cooled solids with respect to said inlet for heated fluids whereby the elapsed time prior to quenching may be varied, means for removing fluids from the lower extremity of said quenching chamber through said conveyance conduit at a low pressure relative to that in said quenching chamber whereby said fluids are caused to flow concurrently with and at a rate sufficient to convey said solids concurrently from said quenching chamber into and through said conveyance conduit, means for applying a thrust force to solids discharging from the outlet thereof thereby maintaining said solids in substantially compact unfluidized form, and means for disengaging cooled fluids from heated solids discharged from said conveyance zone.

References Cited in the file of this patent

UNITED STATES PATENTS

| Number | Name | Date |
|---|---|---|
| 2,304,827 | Jewell | Dec. 15, 1942 |
| 2,376,191 | Roetheli et al. | May 15, 1945 |
| 2,422,501 | Roetheli | June 17, 1947 |
| 2,443,210 | Upham | June 15, 1948 |
| 2,443,337 | Weber | June 15, 1948 |
| 2,456,715 | Leffer | Dec. 21, 1948 |
| 2,543,005 | Evans | Feb. 27, 1951 |
| 2,548,286 | Bergstrom | Apr. 10, 1951 |

FOREIGN PATENTS

| Number | Country | Date |
|---|---|---|
| 180,397 | Great Britain | May 11, 1922 |